United States Patent [19]

Scarpa et al.

[11] Patent Number: 4,627,544
[45] Date of Patent: Dec. 9, 1986

[54] CLOTHES HANGER ASSEMBLY

[75] Inventors: Afra Scarpa; Tobia Scarpa, both of Trevignano, Italy

[73] Assignee: Centro Studi e Servizi Moda di Paola Bertagnin E C. S.A.S., Treviso, Italy

[21] Appl. No.: 692,034

[22] Filed: Jan. 16, 1985

[51] Int. Cl.$^4$ .............................................. A47F 5/00
[52] U.S. Cl. .................................... 211/189; 211/182; 403/300
[58] Field of Search ........................ 211/182, 189, 205; 248/288.3, 288.5, 291, 278, 159; 403/76, 78, 53, 90, 119, 300, 314, 302

[56] References Cited

U.S. PATENT DOCUMENTS

| 1,765,651 | 6/1930 | Bryant | 211/182 X |
| 2,557,766 | 6/1951 | Ronfeldt | 211/182 X |
| 3,864,051 | 2/1975 | Reid | 211/182 X |
| 3,936,111 | 2/1976 | Mazzucconi | 211/182 X |
| 4,034,946 | 7/1977 | Zimmer | 248/278 X |
| 4,068,346 | 1/1978 | Binder | 403/300 X |
| 4,105,348 | 8/1978 | Anderson et al. | 211/182 X |
| 4,461,509 | 7/1984 | Yaotani et al. | 211/182 X |

FOREIGN PATENT DOCUMENTS

| 42393 | 6/1930 | Fed. Rep. of Germany | 211/189 |
| 1170076 | 1/1959 | France | 211/189 |

Primary Examiner—Robert W. Gibson, Jr.
Attorney, Agent, or Firm—Karl F. Ross; Herbert Dubno

[57] ABSTRACT

A clothes hanger assembly in which a plurality of modular elements are provided with accessary holders for the display of garments, the modular elements being adapted to be joined to one another to form a plurality of displays in different shapes and sizes.

10 Claims, 16 Drawing Figures 4,627,544

CLOTHES HANGER ASSEMBLY

FIELD OF THE INVENTION

The present invention relates, in general, to a clothes hanger assembly, and, more particularly, to a clothes hanger assembly in which a plurality of modular elements are provided with accessary holders for the display of garments, the modular elements being adapted to be joined to one another to form a plurality of displays, preferably having a generally anthropomorphic appearance, in different shapes and sizes.

BACKGROUND OF THE INVENTION

In general, in the display of garments, when it is wished to display a garment in a more lifelike manner, dummies are used having a human form, whether it is just the torso portion of the body to display jackets and shirts and the like, or for more extensive clothing, such as suits, dresses or coats, in which case a dummy having a complete human form, including head and extremities, is used.

A drawback to this approach to clothing display is the relative high cost of a display dummy, which is usually a casting of an actual human body, and can be provided with arms and legs which are articulated and add to the complexity of construction, and thus the cost.

Another drawback with display dummies is that they are truly lifesize, so that when stored, present a space problem since they cannot be disassembled.

In an effort to overcome some of these drawbacks, it is known in the art to display clothing on upright stands, which are little more than coat hangers supported on a vertical member and which allows the clothing to be draped, more or less, as it would be in actual use on a person, however, without much form or illusion of motion, since the clothing being displayed is suspended from a member whose shape and size cannot be changed.

Another disadvantage in this type of display stand is that for each garment being displayed, another stand must be used, making it very difficult to achieve an advantageous harmony of the clothing being displayed, since the display usually is that of a basic garment, such as a jacket, and the accessories which would go with this basic garment, such as trousers, shirts, and neckties and the like.

Still another disadvantage as a group of the displays described, is that they all require extraneous illumination, which requires careful positioning of the displays and the lights if the most advantageous appearance is to be achieved, with such extraneous distractions as wiring kept well out of sight.

OBJECTS OF THE INVENTION

It is therefore an object of the present invention to provide an improved clothes hanger assembly which will obviate the aforementioned drawbacks.

Another object of the invention is a provide an improved clothes hanger assembly which is of simple construction.

It is still another object of the invention to provide a clothes hanger assembly which will impart an anthropomorphic appearance to the garments being displayed, but will be easily stored.

It is yet a further object of the invention to provide a clothes hanger assembly which can display clothing and its accessories in a harmonious grouping.

It is still a further object of the invention to provide a clothes hanger assembly provided with illumination forming a part thereof.

SUMMARY OF THE INVENTION

The above and other objects of the invention are attained in a clothes hanger assembly in which a number of modular elements are provided and adapted to be joined together to form a harmonious grouping of displays in different shapes and sizes.

The modular elements are formed of tubular components adapted to be engageable with one another, the tubular components being made up of straight tubes of different lengths, tubes bent at 90°, tubes bent at 45°, U-shaped tubes, and T-shaped tubes.

The modular elements of the assembly are formed in different configurations, with at least one modular element being formed as a mannequin and another formed as a support for a lamp to provide illumination, the remaining modular elements having configurations which will impart an anthropomorphic appearance to the garment, such as reclining figures.

The tubular components which form the modular elements can be joined together by either rigid or pivotable connections, so that any of the tubular components can be connected to any other component in an almost infinite variety of shapes and sizes.

For instance, the mannequin element is formed by a basic upright tubular component having a vertical tube provided with two oppositely extending horizontal tubes formed near the upper end thereof, the lower end of the vertical tube being provided with another tube disposed transverse thereto. This basic upright component forms the torso portion of the mannequin. To each free end of the horizontal tubes there is attached another tube with a 90° bend and which is rotatably adjustable to give the illusion of an arm bent at different angles. To the free ends of the lower transverse tube there are attached further right-angle tubes, also rotatably adjustable, which represent the hip joint of the mannequin. Each of these right-angle tubes in turn carries a straight tube portion representing the thigh, to each lower end of which there is connected, by a pivot member representing the knee joint, a U-shaped tube representing the shin portion of a leg.

Thus, it can be seen that the mannequin according to the present invention, can assume strikingly life-like positions that give the garments displayed thereon a substantially human appearance.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 1:
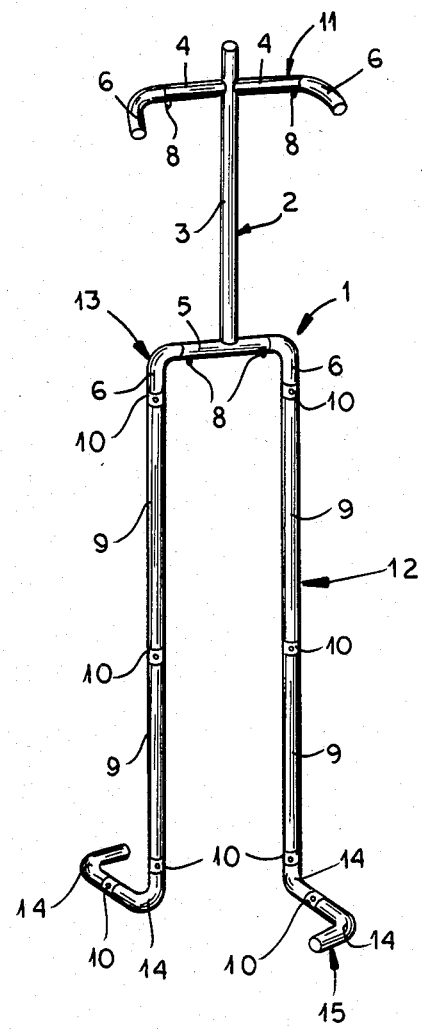
FIG. 1 is a perspective view of the modular element of the assembly formed as a mannequin according to the invention.
Figure 3:
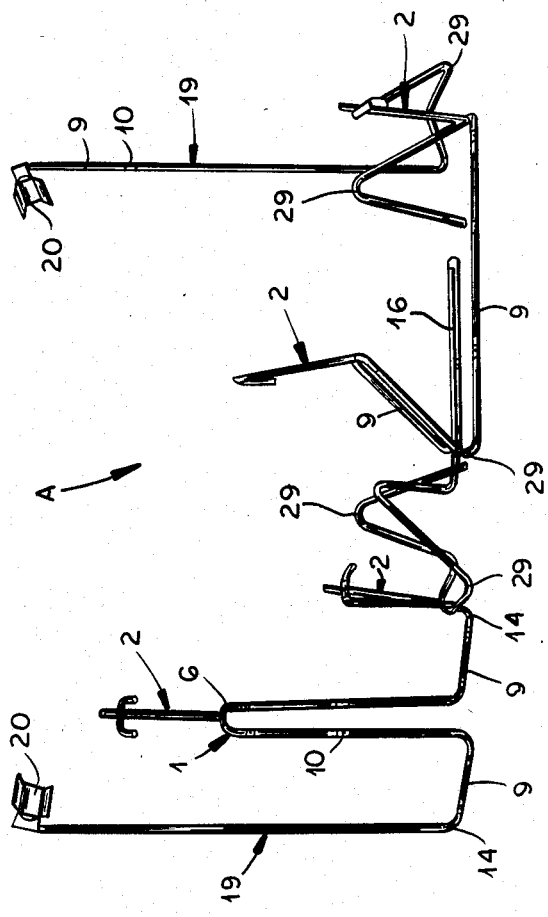
FIG. 3 is a perspective view of the entire assembly.
Figure 4:
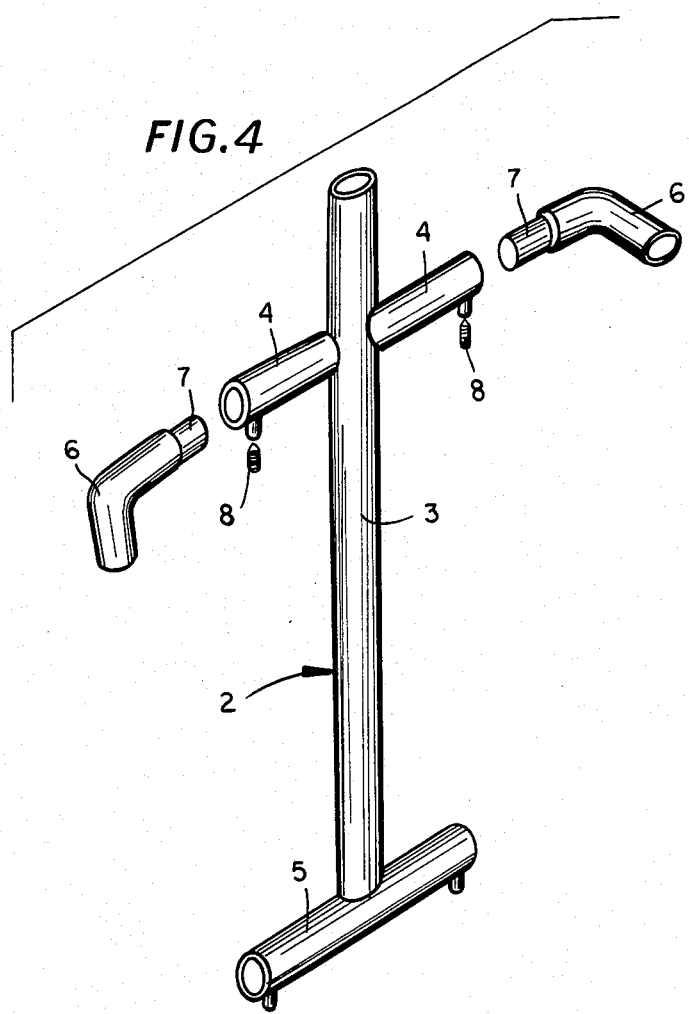
FIG. 4 is a perspective exploded view of the basic tubular component of the mannequin element.
Figure 5A:
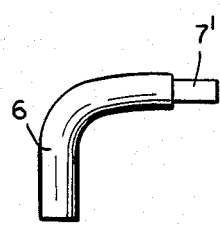
FIG. 5A is an elevational view of one embodiment of a right-angled tubular component.

FIG. 1 illustrates the mannequin element 1 of the assembly A shown in FIG. 3, and which is formed by a basic upright component 2, shown more clearly in FIG. 4, the basic component 2 having a vertical tube 3 provided with two oppositely extending horizontal tubes 4 formed near the upper end of the tube 3, the lower end of which is provided with another tube 5 disposed transverse thereto. To each free end of the tubes 4 there is attached another tube 6 with a 90° bend, shown in detail in FIG. 5A, the tubes 6 each being formed at one end with a protruding core 7 having an outer diameter substantially equal to the inner diameter of the tubes 4, enabling the tubes 6 to be interfitted into the tubes 4 and held in place there by set screws 8 provided therein, as well as in tube 5, the basic component 2 forming the torso portion of the mannequin 1, the tubes 6 representing the arms 11 of the mannequin.

Figure 5B:
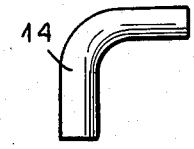
FIG. 5B is an elevational view of another embodiment of a right-angled tubular component.
Figure 6A:
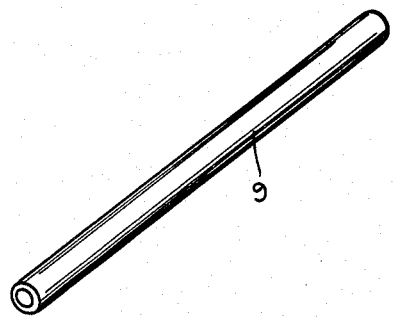
FIG. 6A is a perspective view of a straight tubular component.
Figure 6:
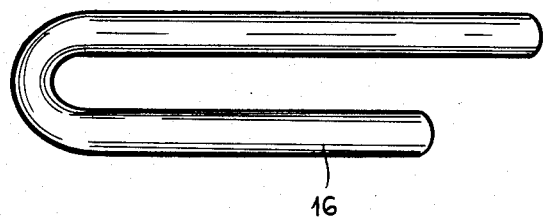
FIG. 6B is a perspective view of a U-shaped tubular component.

The free ends of tube 5 are also interfitted with right-angle tubes 6, which here represent the hip joints 13 of the mannequin and which are in turn connected to straight tube components 9, shown in detail in FIG. 6A, by the interposition of clamping members 10, shown in detail in FIGS. 7 and 8 and described further below, the tube components 9 in this case representing the legs 12 of the mannequin. Feet 15 are provided at the lower ends of the legs 12 and are formed by another type of right-angle tube 14, shown in detail in FIG. 5B, which are connected to the legs also by the interposition of clamping members 10 between the tubes 9 and 14. Thus, a modular element is formed as a free standing mannequin 1, which can be adjusted to assume different positions and sizes.

Figure 2:
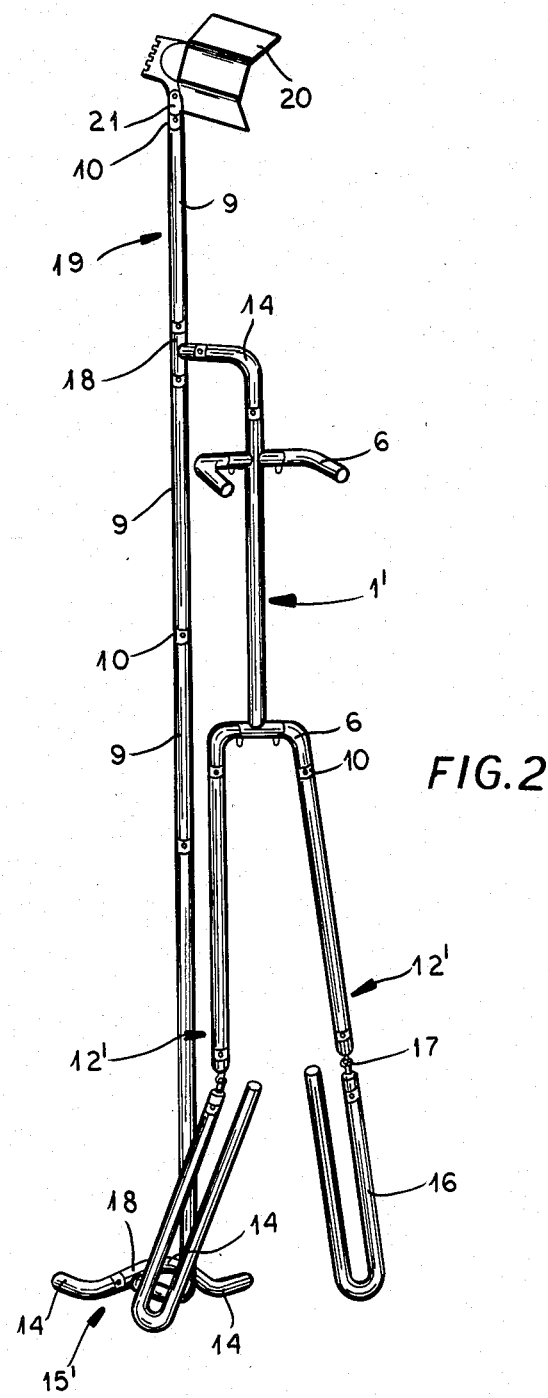
FIG. 2 is a perspective view of the mannequin element joined to the lamp support element of the assembly.
Figure 9:
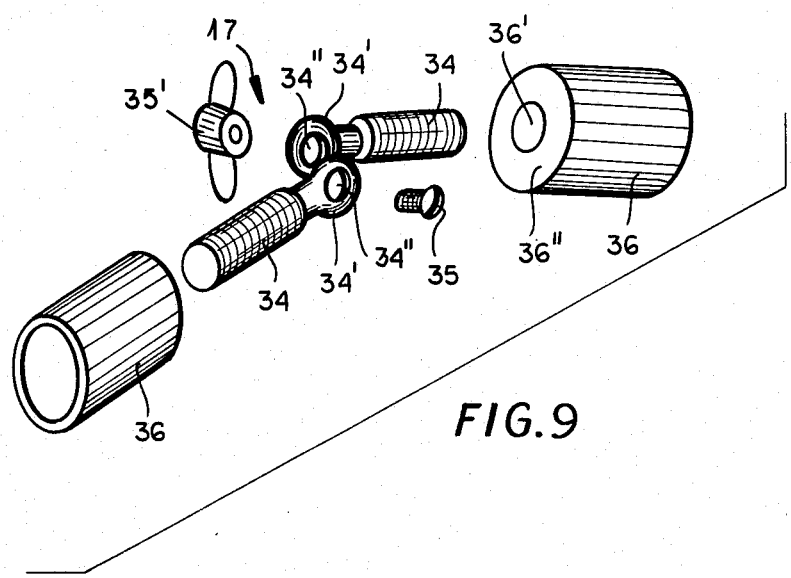
FIG. 9 is a perspective exploded view of a pivot member.
Figure 10:
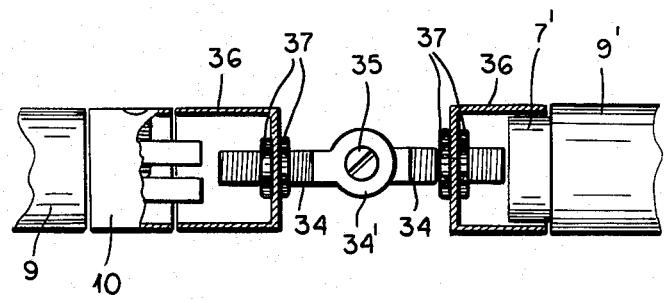
FIG. 10 is a sectional view of the pivot member interposed between two tubular components.

A slightly different embodiment of a mannequin 1' is shown in FIG. 2, in which the feet 15 have been eliminated and replaced by U-shaped tubular components 16, shown in detail in FIG. 6B, and connected to tubes 9 of the legs 12' by the interposition of pivot members 17, shown in greater detail in FIGS. 9 and 10, the tubes 16 representing the shin portion of the legs 12' and pivot members 17 representing the knee joints.

Figure 5C:
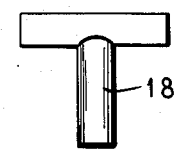
FIG. 5C is an elevational view of a T-shaped tubular component.

This particular embodiment of the mannequin 1' is not free standing but is supported by a right-angle tube 14 connected by a T-shaped tubular component 18, shown in detail in FIG. 5C, to a lamp support element 19.

Figure 11A:
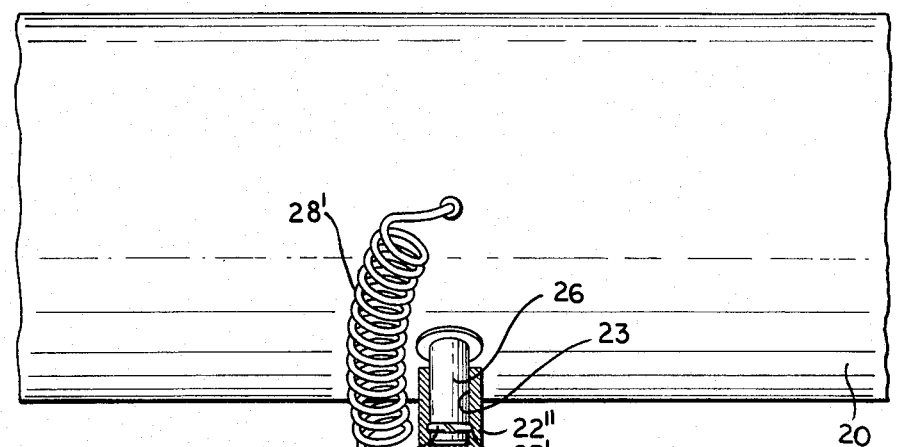
FIG. 11A is a rear elevational view of the lamp with the tubular lamp holder thereof shown in axial section.
Figure 11B:
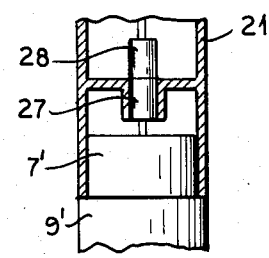
FIG. 11B is a sectional view of the lamp holder showing an alternative mounting on a tubular component.
Figure 12:
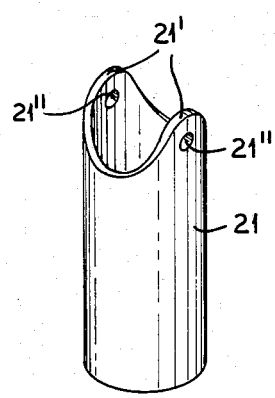
FIG. 12 is a perspective view of the lamp holder.

The lamp support element 19 is formed by a number of straight tubular components 9 joined together by clamping members 10 and provided at the lower end with a foot or base 15', formed by a number of interconnected right-angle tubes 14, joined to the upright lamp support by a T-shaped tube 18. At the upper end of the lamp support 19 there is provided a lamp 20 pivotally mounted in a tubular lamp holder 21, shown in greater detail in FIGS. 11A, 11B and 12, and which is in turn mounted on a tube portion 9 of the support 19 by the interposition of a clamping member 10, or by a straight tube component 9' having a protruding core 7' interfitting with the lamp holder 21, as shown in FIG. 11B.

The upper end of the tubular lamp holder 21 is contoured, whereby a pair of cheeks 21' are formed and flank the ball portion 22' of a swivel joint 22 having a projection 22" formed with a blind bore 23 having a circular groove 23' formed in the wall of the bore 23. The cheeks 21' are each provided with a bore 21" in axial alignment with a throughgoing bore 24 formed in the ball 22' and traversed by bolt 25 about which the swivel joint 22 pivots, the bolt 25 being provided with a wing nut 25'. A stud 26 extending downwardly from the lamp 20 is provided with a snap ring 26' and plugs into the blind bore 23 where the snap ring 26' engages in the circular groove 23', enabling the lamp 20 to rotate on the projection 22" without becoming easily disengaged, while tightening of the wing nut 25' enables the lamp 20 to be locked in different pivoted positions.

The lamp holder 21 is further provided with an electrical socket 27 supplied by a conductor 27' extending through the lamp support element 19 to a source of current. An electrical plug 28 connects with the socket 27 to supply current to the lamp 20 by way of the wire 28', which passes into the lamp holder 21 through a clearance between the contoured end of the holder and the ball portion 22'.

The entire assembly A of interconnected modular elements is shown in FIG. 3 where, in addition to the modular elements 1 and 19 already described, the basic torso components 2 are shown supported by tubular components 29 bent at a 45° angle, all of the types of tubular components 2, 6, 9, 14, 16, 18 and 29 already described being interconnected by either clamping members 10, pivot members 17, protruding cores 7 or 7' or any mixed combination of connecting methods.

Figure 7:
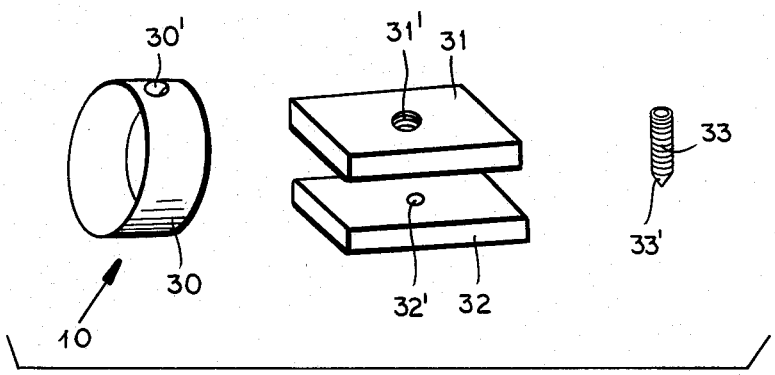
FIG. 7 is a perspective exploded view of a clamping member.
Figure 8:
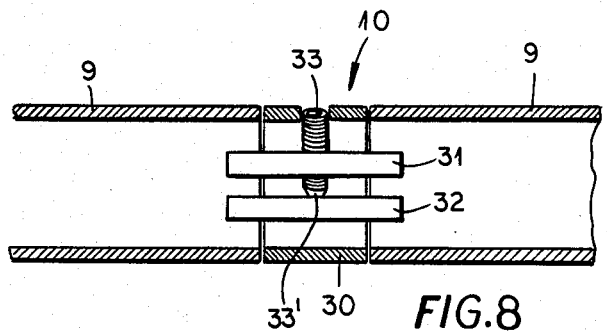
FIG. 8 is a sectional view of the clamping member interposed between two tubular components.

The clamping member 10 referred to earlier is shown in detail in FIGS. 7 and 8 and comprises a sleeve 30 having the same diameter as the tubular components, with a pair of superposed plates 31 and 32 disposed in the sleeve 30 and having extremities protruding therefrom for insertion into the ends of the tubular components to be joined, as illustrated for the tubes 9, the plate 31 being formed with a threaded bore 31' in the center thereof and the plate 32 being formed with a dimple 32' in axial alignment with the bore 31'. A set screw 33 having a point 33' is threaded into the bore 31' through an opening 30' formed in the wall of the sleeve 30 and engages the dimple 32' with the point 33', bearing on the plate 32 and driving the plates 31 and 32 apart, whereby the tubular components to be joined are engaged and clamped.

The pivot member 17 referred to earlier is shown in detail in FIGS. 9 and 10 and comprises a pair of threaded elements 34, each element 34 being formed with an axially offset head 34' so that the threaded elements 34 can be arranged with their respective heads 34' offset from one another, the heads 34' being formed with respective bores 34" traversed by a screw 35 about which the threaded elements 34 are articulated, the screw 35 being provided with a wing nut 35' for locking the threaded elements 34 in different angular positions relative to one another. Respective tubular end caps 36 having the same diameter as the tubular components are fitted onto the threaded elements by way of an opening 36' formed in the endwall 36" of the end caps 36, the caps 36 being held on the threaded elements 34 by nuts 37.

As illustrated in FIG. 10, the end caps 36 can engage the tubular components by either the interposition of a clamping member 10 or the interfitting with a protruding core 7 or 7'.

Thus it can be seen that the modular elements of the assembly can be formed in many different configurations which will impart an anthropomorphic appearance to the garments displayed thereon, yet the assembly is of simple construction which enables easy disassembly for forming different shapes or for storage, the overall appearance and particular modular element configurations not being limited to those illustrated.

We claim:

1. A clothes hanger assembly comprising a plurality of modular elements provided with accessary holders for the display of garments, said modular elements being adapted to be joined to one another to form a plurality of displays in different shapes and sizes, at least one of said modular elements being formed as a mannequin, said modular elements being formed of tubular components adapted to be engageable with one another, each of said tubular components including straight tubes of different lengths and tubes bent at 90°, said tubular components being engageable with one another by the interposition between at least some of said tubular components of a clamping member, said clamping member comprising:
    a sleeve having the same diameter as said tubular components;
    a pair of superposed plates disposed in said sleeve and having extremities protruding therefrom for insertion into the ends of the tubular components to be joined, one of said plates being formed with a threaded bore centrally thereof; and
    a set screw threaded into said bore through an opening formed in the wall of said sleeve, said set screw bearing on the other of said plates for driving said superposed plates apart, whereby said tubular components to be joined are engaged and clamped.

2. The assembly defined in claim 1 wherein said mannequin is formed by a basic upright tubular component having a vertical tube thereof provided with two oppositely extending horizontal tubes formed near the upper end of said vertical tube, the lower end of said vertical tube being provided with another tube disposed transverse thereto.

3. The assembly defined in claim 1 wherein at least some of said tubular components are formed at least at one end thereof with a protruding core having an outer diameter substantially equal to the inner diameter of said tubular components enabling said tubular components to be interfitted with one another.

4. A clothes hanger assembly comprising a plurality of modular elements provided with accessary holders for the display of garments, said modular elements being adapted to be joined to one another to form a plurality of displays in different shapes and sizes, at least one of said modular elements being formed as a mannequin, said modular elements being formed of tubular components adapted to be engageable with one another, each of said tubular components including straight tubes of different lengths and tubes bent at 90°, said tubular components being engageable with one another by the interposition between at least some of said tubular components of a pivot member, said pivot member comprising:
    a pair of threaded elements each element being formed with a respective head axially offset from the respective head of the other element, each head being formed with a respective throughgoing bore lying transverse to the axis of the respective threaded element, said bores being in axial alignment with one another and traversed by a screw about which said threaded elements are articulated, the free end of said screw being engageable by a wing nut for locking said threaded elements in different angular positions relative to one another;
    a respective end cap threaded onto the free end of each threaded element, said end caps having the same diameter as said tubular components; and
    means for attaching said ends caps to said tubular components.

5. The assembly defined in claim 4 wherein said means for attaching said end caps to said tubular elements comprises a respective clamping member interposed between the end cap and the tubular component.

6. The assembly defined in claim 4 wherein said means for attaching said end caps to said tubular components comprises a respective protruding core formed at the extremity of the tubular component to which an end cap is to be attached, said protruding core having an outer diameter substantially equal to the inner diameter of the respective end cap, enabling said end caps and said tubular components to be interfitted with one another.

7. A clothes hanger assembly comprising a plurality of modular elements provided with accessary holders for the display of garments, said modular elements being adapted to be joined to one another to form a plurality of displays in different shapes and sizes, at least one of said modular elements being formed as a mannequin, said modular elements being formed of tubular components adapted to be engageable with one another, wherein at least another of said modular elements is formed as a support for a lamp comprising:
    a basic upright tubular component;
    a tubular lamp holder having the same diameter as said tubular components;
    means for attaching said lamp holder to the upper end of said upright component;
    a removable swivel joint pivotally mounted in said lamp holder and formed with a projection extending beyond the upper end of said lamp holder, said projection being formed with a blind bore having a first circular groove formed in the wall thereof, said bore and groove defining a mechanical socket;
    a stud extending downwardly from said lamp and being formed with a second circular groove, said second groove being provided with an expandable ring engageable with said first groove, said stud being plugged into said mechanical socket and freely rotatable therein;

an electrical socket mounted in said lamp holder and supplied by a conductor extending through said basic upright component; and an electrical plug connected to said lamp and connectable to said electrical socket for providing current to said lamp.

8. The assembly defined in claim 7 wherein said means for attaching said lamp holder to the upper end of said upright component comprises a clamping member interposed between said upright component and said lamp holder.

9. The assembly defined in claim 7 wherein said means for attaching said lamp holder to the upper end of said upright component comprises a protruding core formed at the upper end of said upright tubular component, said protruding core having an outer diameter substantially equal to the inner diameter of said lamp holder, enabling said upright component to be interfitted with said lamp holder.

10. The assembly defined in claim 7 wherein the upper end of said tubular lamp holder is contoured, whereby a pair of cheeks are formed flanking said swivel joint, said cheeks each being formed with a bore in axial alignment with one another and with another throughgoing bore formed in said swivel joint, said cheeks and said swivel joint being traversed by a screw about which said swivel joint pivots, the free end of said screw being engaged by a wing nut for locking said lamp in different angular positions.

* * * * *

UNITED STATES PATENT AND TRADEMARK OFFICE
CERTIFICATE OF CORRECTION

PATENT NO. : 4,627,544

DATED : December 9, 1986

INVENTOR(S) : Afra Bianchin SCARPA et al

It is certified that error appears in the above-identified patent and that said Letters Patent is hereby corrected as shown below:

Title page:

Item [75] First Inventor's name is to read:

--Afra BIANCHIN SCARPA --.

Signed and Sealed this

Twenty-first Day of April, 1987

Attest:

DONALD J. QUIGG

*Attesting Officer*  *Commissioner of Patents and Trademarks*